(12) United States Patent
Subramanian et al.

(10) Patent No.: US 7,784,667 B2
(45) Date of Patent: Aug. 31, 2010

(54) APPARATUS AND METHOD FOR FRICTION STIR WELDING USING A CONSUMABLE PIN TOOL

(75) Inventors: Pazhayannur Ramanathan Subramanian, Niskayuna, NY (US); Earl Claude Helder, Cincinnati, OH (US); Timothy Joseph Trapp, Upper Arlington, OH (US)

(73) Assignee: General Electric Company, Niskayuna, NY (US)

( * ) Notice: Subject to any disclaimer, the term of this patent is extended or adjusted under 35 U.S.C. 154(b) by 418 days.

(21) Appl. No.: 11/386,998

(22) Filed: Mar. 23, 2006

(65) Prior Publication Data

US 2006/0163328 A1      Jul. 27, 2006

Related U.S. Application Data

(62) Division of application No. 10/652,532, filed on Aug. 29, 2003, now abandoned.

(51) Int. Cl.
    *B23K 20/12*   (2006.01)
(52) U.S. Cl. .................................. 228/112.1; 228/2.1
(58) Field of Classification Search .............. 228/112.1, 228/2.1
    See application file for complete search history.

(56) References Cited

U.S. PATENT DOCUMENTS

| 5,469,617 A * | 11/1995 | Thomas et al. ........... 29/889.21 |
| 5,697,544 A | 12/1997 | Wykes |
| 5,713,507 A | 2/1998 | Holt et al. |
| 5,893,507 A * | 4/1999 | Ding et al. .................... 228/2.1 |
| 5,975,406 A | 11/1999 | Mahoney et al. |
| 6,045,027 A | 4/2000 | Rosen et al. |
| 6,206,268 B1 | 3/2001 | Mahoney |
| 6,247,633 B1 * | 6/2001 | White et al. ............. 228/112.1 |
| 6,421,578 B1 | 7/2002 | Adams et al. |
| 6,497,355 B1 * | 12/2002 | Ding et al. .................... 228/2.1 |

(Continued)

FOREIGN PATENT DOCUMENTS

JP        61176484 A  *  8/1986

(Continued)

OTHER PUBLICATIONS

JPO machine translation of JP 11-267857.*

(Continued)

*Primary Examiner*—Jessica L Ward
*Assistant Examiner*—Kevin E Yoon
(74) *Attorney, Agent, or Firm*—Paul J. DiConza

(57) ABSTRACT

The present invention provides a friction stir welding apparatus operable for welding one or more metals, metal alloys, or other materials, and a method for friction stir welding. The friction stir welding apparatus includes a pin tool holder, a shoulder having a surface coupled to the pin tool holder, and a pin tool coupled to the pin tool holder, the pin tool at least partially protruding from the surface of the shoulder, wherein the pin tool is made of a consumable pin tool material. The method includes introducing the pin tool into a workpiece; traversing the pin tool along a joint to be welded on the workpiece; and substantially continuously feeding the pin tool into the weld joint as it is traversed along the joint, thereby incorporating at least a portion of the consumable pin tool material into the volume of the joint to be welded.

21 Claims, 4 Drawing Sheets

U.S. PATENT DOCUMENTS

| | | | |
|---|---|---|---|
| 6,543,671 B2 | 4/2003 | Hatten et al. | |
| 6,638,641 B2 | 10/2003 | Delano | |
| 6,758,382 B1 * | 7/2004 | Carter | 228/2.1 |
| 2003/0042292 A1 | 3/2003 | Hatten et al. | |
| 2003/0201306 A1 | 10/2003 | McTeman et al. | |
| 2003/0205565 A1 * | 11/2003 | Nelson et al. | 219/148 |
| 2005/0173493 A1 | 8/2005 | Workman et al. | |

FOREIGN PATENT DOCUMENTS

| | | | |
|---|---|---|---|
| JP | 11267857 | | 10/1999 |
| JP | 2001252774 A | * | 9/2001 |

OTHER PUBLICATIONS

EP Search Report 0425 5144, The Hague, Dec. 10, 2004.

* cited by examiner

APPARATUS AND METHOD FOR FRICTION STIR WELDING USING A CONSUMABLE PIN TOOL

This application is a division of application Ser. No. 10/652,532, filed 29 Aug. 2003, which is hereby incorporated by reference in its entirety.

FIELD OF THE INVENTION

The present invention relates generally to an apparatus and a method for friction stir welding. More specifically, the present invention relates to an apparatus and a method for friction stir welding using a consumable pin tool.

BACKGROUND OF THE INVENTION

Friction stir welding is a solid-state joining technique that is well known to those of ordinary skill in the art. Typically, friction stir welding is used to join difficult-to-weld metals, metal alloys (such as aluminum alloys, titanium alloys, nickel alloys, and the like), and other materials. For example, certain aluminum alloys are sensitive in a plasticized heat-affected zone, where the base metal reaches temperatures between solidus and liquidus during welding. In this zone, partial melting at grain boundaries forms a network containing brittle compounds. As a result, weld ductility is substantially reduced. Likewise, other conventional joining techniques may create geometric distortions near a weld joint due to high temperature gradients induced in a workpiece during welding. These distortions may cause warping and other dimensional defects in the workpiece, as well as residual stresses that may cause premature failure by cracking in the heat-affected zone or weld joint, lamellar tearing, or by stress-corrosion cracking in some metals and metal alloys. In addition, some metals, metal alloys, other materials, and types of weld joints are difficult to join except in a flat position.

Friction stir welding techniques overcome many of the problems encountered with other conventional joining techniques. In friction stir welding, a cylindrical, non-consumable, rotating pin tool is plunged into a rigidly clamped workpiece and traversed along the joint to be welded. The pin tool is specially designed to provide a combination of frictional heat and thermo-mechanical working to accomplish the weld. As the pin tool is traversed along the joint to be welded, the plasticized metal, metal alloy, or other material is transferred from the leading edge of the pin tool to the trailing edge of the pin tool, forming a strong solid-state weld joint in the wake of the pin tool. During the friction stir welding of hard metals and metal alloys, such as steel, titanium alloys, and nickel alloys, high temperatures are generated in the pin tool, as well as the pin tool holder. Under such conditions, pin tool degradation is a serious problem. Pin tool wear and pin tool debris entrapment are issues that must be addressed in order to obtain a defect-free weld joint.

Conventional friction stir welding apparatuses and methods have been designed, at least in part, to address some of these problems, with limited success. For example, U.S. Patent Application No. 2003/0075584 (Sarik et al.) discloses an apparatus for use in friction stir welding including a friction stir tool, having a shoulder, a non-consumable welding pin extending downward centrally from the shoulder, a first workpiece disposed on a backing workpiece, a second workpiece located a predetermined distance from the first workpiece on the backing workpiece, and a transition strip disposed on the backing workpiece between the first workpiece and the second workpiece, wherein the contact area or a space between the transition strip and the first workpiece defines a first interface and the contact area or a space between the transition strip and the second workpiece defines a second interface, wherein the non-consumable welding pin is rotated over the first interface and the second interface to weld the first workpiece to the second workpiece with the transition strip material incorporated as part of the weld.

U.S. Pat. No. 6,543,671 (U.S. Patent Application No. 2003/0042292) (Hatten et al.) discloses a friction stir welding tool that includes a body having an upper surface defining an entrance opening and a lower surface, and a pin having a lower surface defining an exit opening, wherein the pin extends from the lower surface of the body. The friction stir welding tool also includes a passageway defined by the body and the pin from the entrance opening to the exit opening and is capable of allowing a filler material to pass therethrough. A friction stir welding method includes applying a frictional heating source to a workpiece to plasticize a volume of the workpiece and applying the frictional heating source to a filler material to plasticize the filler material. The friction stir welding method also includes introducing the filler material into the volume of the workpiece and incorporating the filler material into the volume of the workpiece.

U.S. Pat. No. 6,206,268 (Mahoney) discloses a friction stir welding pin having internal flow cavities. The pin is adapted to be driven by a conventional friction stir welding machine, and may include external threads for forcing plasticized material toward the weld root. An internal cavity located along the centerline and open to the distal end facilitates deformation of the workpiece material at the weld root. One or more flow channels extending from the sidewall of the pin to the internal flow cavity induce a continuous path of plasticized material through the pin. The internal cavity may include internal threads to further help force plasticized material toward the weld root. The pin is particularly useful in welding aluminum workpieces where the tolerance of the workpiece thickness is not critical.

In general, conventional friction stir welding apparatuses and methods fail to address the problem of pin tool degradation. In some cases, pin tools are manufactured from relatively hard refractory metal alloys, such as molybdenum alloys, tungsten alloys, and the like, in order to minimize pin tool degradation. However, pin tool wear and pin tool debris entrapment still occur, resulting in weld joints with defects. The present invention provides friction stir welding apparatuses and methods that address these problems and issues.

BRIEF SUMMARY OF THE INVENTION

In various embodiments, the present invention provides friction stir welding apparatuses and methods that use a consumable pin tool. The consumable pin tool is manufactured from a material that is the same as, similar to, or dissimilar from the workpiece to be friction stir welded. The consumable pin tool is substantially continuously fed into the joint to be welded and is incorporated into the weld joint. The feeding of the consumable pin tool is accomplished using a retractable pin tool holder including an annular cylindrical shoulder through the center of which the consumable pin tool is advanced. The shoulder may be consumable or non-consumable.

Advantageously, the friction stir welding apparatuses and methods of the present invention provide a defect-free weld joint, without entrapped pin tool debris. As a result, the weld joint demonstrates improved mechanical properties (e.g., mechanical strength). Because, in one embodiment of the present invention, the filler material is the same as or similar to the workpiece material, the weld joint demonstrates improved microstructure. Because, in another embodiment of the present invention, the filler material is dissimilar from the workpiece material, the material chemistry of the substrate may be locally altered and/or a clad layer or the like may be added. The friction stir welding apparatuses and methods of the present invention allow for the welding of complex joints, other than butt-joints, and the welding of workpieces with less-than-optimal fit-up (e.g., with large joint gaps or shape mismatches) due to the ability to add filler material. Finally, the friction stir welding apparatuses and methods of the present invention provide the ability to locally increase the thickness of the weld joint, thus increasing joint efficiency.

In one embodiment of the present invention, a friction stir welding apparatus operable for welding one or more metals, metal alloys, or other materials includes a pin tool holder, a shoulder having a surface coupled to the pin tool holder, and a pin tool coupled to the pin tool holder, the pin tool at least partially protruding from the surface of the shoulder, wherein the pin tool is made of a consumable pin tool material. Optionally, the shoulder rotates at a predetermined rotational speed and is retractable into/extendable from the pin tool holder at a substantially constant rate. Optionally, the shoulder is also made of a consumable shoulder material that is at least partially incorporated into the volume of a joint to be welded. The consumable shoulder material comprises a material that is the same as, similar to, or dissimilar from one or more materials comprising a workpiece to be friction stir welded. Preferably, the pin tool rotates at a predetermined rotational speed and is retractable into/extendable from the surface of the shoulder at a substantially constant rate. The consumable pin tool material is at least partially incorporated into the volume of the joint to be welded. The consumable pin tool material comprises a material that is the same as, similar to, or dissimilar from one or more materials comprising the workpiece to be friction stir welded. The shoulder has a substantially cylindrical shape and the pin tool has a substantially cylindrical, substantially rod-like, or substantially conical shape. Optionally, the pin tool includes a taper, one or more truncations, a plurality of threads, and/or a radius tip.

In another embodiment of the present invention, a friction stir welding apparatus operable for welding one or more metals, metal alloys, or other materials includes a pin tool holder, a shoulder having a surface coupled to the pin tool holder, and a pin tool coupled to the pin tool holder, the pin tool at least partially protruding from the surface of the shoulder and retractable into/extendable from the surface of the shoulder at a substantially constant rate, wherein the pin tool rotates at a first predetermined rotational speed, and wherein the pin tool is made of a consumable pin tool material. Optionally, the shoulder rotates at a second predetermined rotational speed and is retractable into/extendable from the pin tool holder at a substantially constant rate. Optionally, the shoulder is also made of a consumable shoulder material that is at least partially incorporated into the volume of a joint to be welded. The consumable shoulder material comprises a material that is the same as, similar to, or dissimilar from one or more materials comprising a workpiece to be friction stir welded. The consumable pin tool material is at least partially incorporated into the volume of the joint to be welded. The consumable pin tool material comprises a material that is the same as, similar to, or dissimilar from one or more materials comprising the workpiece to be friction stir welded. The shoulder has a substantially cylindrical shape and the pin tool has a substantially cylindrical, substantially rod-like, or substantially conical shape. Optionally, the pin tool includes a taper, one or more truncations, a plurality of threads, and/or a radius tip.

In a further embodiment of the present invention, a method for friction stir welding one or more metals, metal alloys, or other materials includes providing a pin tool holder; providing a shoulder having a surface coupled to the pin tool holder; providing a pin tool coupled to the pin tool holder, the pin tool at least partially protruding from the surface of the shoulder, wherein the pin tool is made of a consumable pin tool material; and incorporating at least a portion of the consumable pin tool material into the volume of a joint to be welded. Optionally, providing the shoulder further includes rotating the shoulder at a predetermined rotational speed and retracting the shoulder into/extending the shoulder from the pin tool holder at a substantially constant rate. Optionally, the shoulder is also made of a consumable shoulder material and the method further includes incorporating at least a portion of the consumable shoulder material into the volume of the joint to be welded. The consumable shoulder material comprises a material that is the same as, similar to, or dissimilar from one or more materials comprising a workpiece to be friction stir welded. Preferably, providing the pin tool further includes rotating the pin tool at a predetermined rotational speed and retracting the pin tool into/extending the pin tool from the surface of the shoulder at a substantially constant rate. The consumable pin tool material comprises a material that is the same as, similar to, or dissimilar from one or more materials comprising the workpiece to be friction stir welded. The shoulder has a substantially cylindrical shape and the pin tool has a substantially cylindrical, substantially rod-like, or substantially conical shape. Optionally, the pin tool includes a taper, one or more truncations, a plurality of threads, and/or a radius tip.

DETAILED DESCRIPTION OF THE INVENTION

Figure 1:
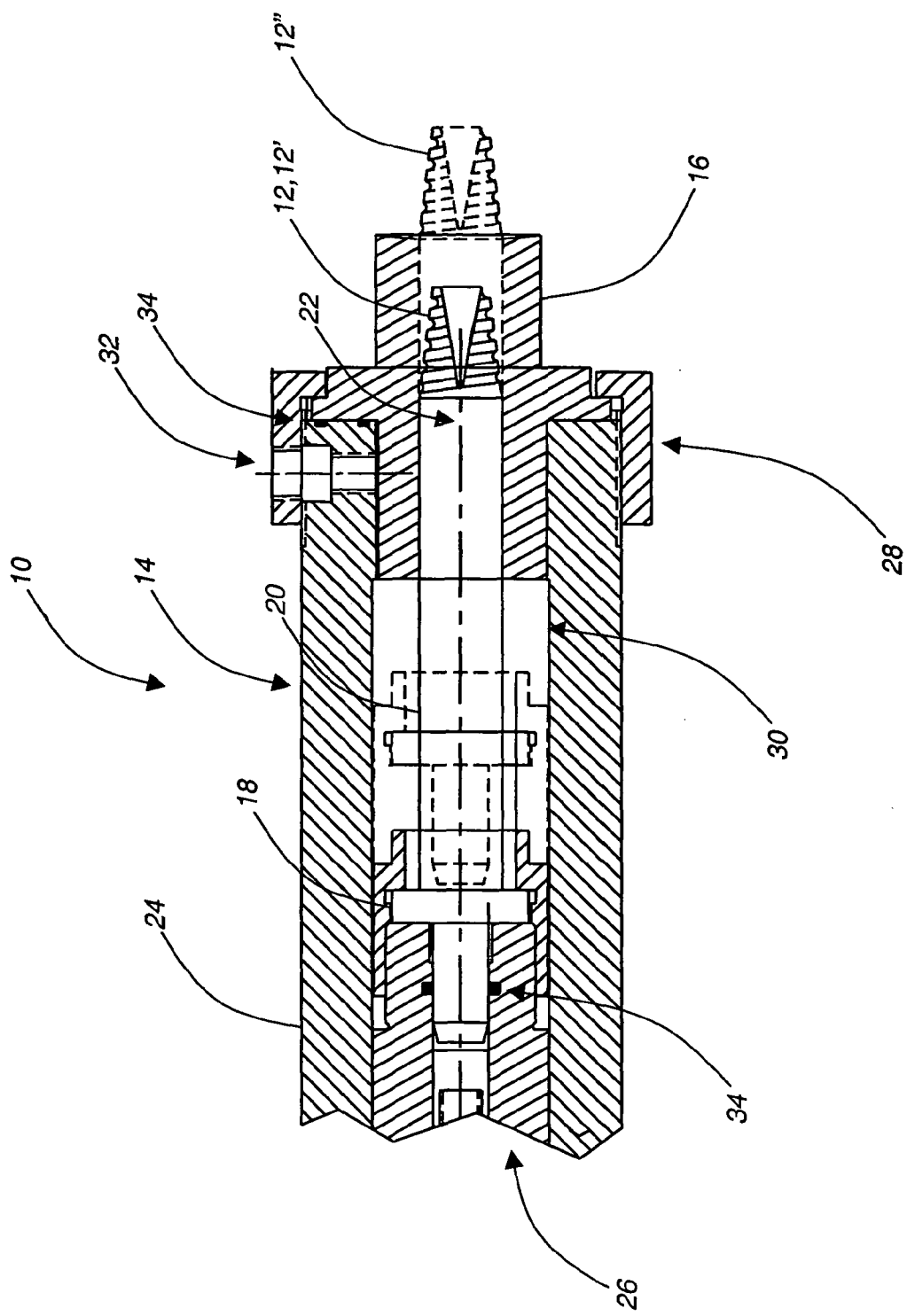
FIG. 1 is a cross-sectional side view of one embodiment of the friction stir welding apparatus of the present invention, highlighting the configuration and operation of the consumable pin tool.
Figure 2:
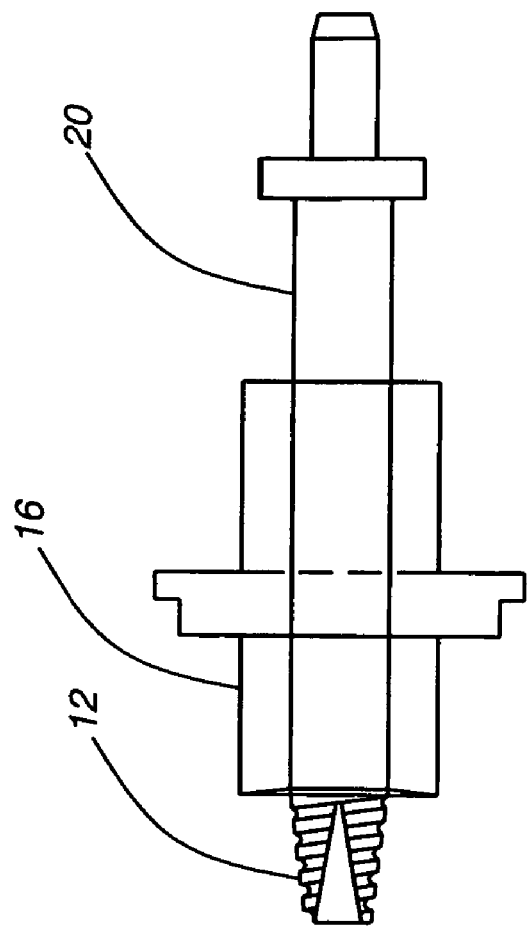
FIG. 2 is a side and end view of a portion of the friction stir welding apparatus of FIG. 1.
Figure 2:
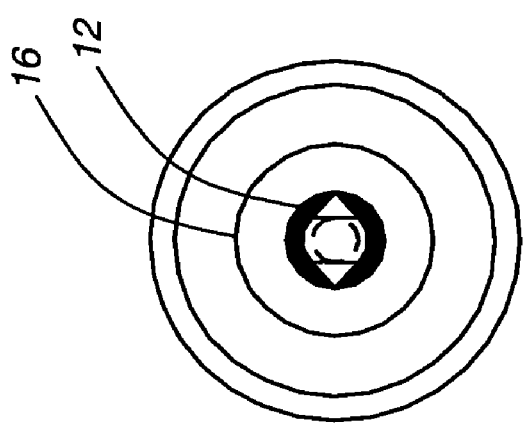
Figure 3:
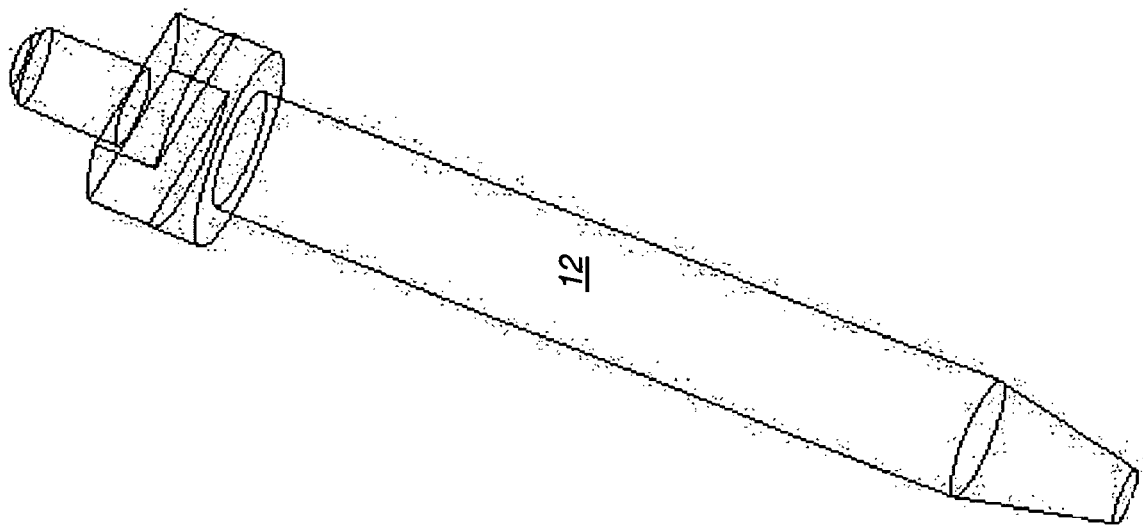
FIG. 3 is a perspective view of another embodiment of the consumable pin tool of the present invention.
Figure 4:
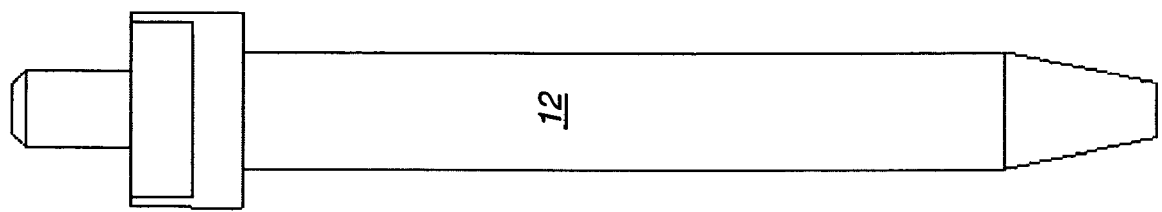
FIG. 4 is a side view of the consumable pin tool of FIG. 3.

Referring to FIGS. 1 and 2, in one embodiment, the friction stir welding apparatus 10 of the present invention includes a consumable pin tool 12 that is selectively disposed within a pin tool holder 14. The pin tool 12 is selectively and continuously movable between a first, retracted position 12' and a second, extended position 12". In the second, extended position 12", the pin tool 12 at least partially protrudes beyond the surface of a shoulder 16 associated with the pin tool 12 and the pin tool holder 14. Preferably, the pin tool 12 has a substantially cylindrical, rod-like, or conical shape. For example, the pin tool 12 may have a substantially pointed shape with a taper of about 45 degrees. Optionally, the pin tool 12 is threaded and/or incorporates one or more sharp edges and/or flat surfaces. The pin tool 12 may also be partially or wholly hollow. In the substantially cylindrical or rod-like configuration, the initial diameter and length of the pin tool 12, before being partially or wholly incorporated into a weld, are about equal to the thickness of the workpiece to be friction stir welded for a full-penetration weld. For a partial-penetration weld, the initial diameter and length of the pin tool 12 are smaller than the thickness of the workpiece to be friction stir welded. The pin tool 12 is coupled to a drive mechanism 18 via a stem piece 20. Preferably, the stem piece 20 has a substantially cylindrical shape, although other suitable shapes may be used. The drive mechanism 18 is operable for rotating the pin tool 12 and, optionally, the shoulder 16 about an axis 22 of the pin tool 12, the shoulder 16, and the pin tool holder 14. Typically, the pin tool 12 is rotated at a speed of between about 150 rpm and about 1000 rpm during friction stir welding. It should be noted that the rotational speed is dependent upon the thickness of the workpiece to be friction stir welded, with thinner sections requiring higher rotational speeds and thicker sections requiring lower rotational speeds. The pin tool 12 is made of a material that is the same as, similar to, or dissimilar from the workpiece to be friction stir welded. For example, if a metal or metal alloy is to be friction stir welded, the pin tool 12 may be made of that same metal or metal alloy, another similar metal or metal alloy, or any other dissimilar material that provides a desired characteristic when the material is incorporated into the weld.

The shoulder 16 comprises an annular structure through which the pin tool 12 is fed. Preferably, the shoulder 16 has a substantially cylindrical shape, although other suitable shapes may be used. The shoulder 16 has an inside diameter that is slightly larger than the diameter of the pin tool 12 in order to accommodate the pin tool 12 without restriction and/or binding. The shoulder 16 has an outside diameter that is about two to three times larger than the diameter of the pin tool 12, although any suitable dimensions may be used. The shoulder 16 protrudes from the pin tool holder 14 by about 0.5 inches, although any suitable dimensions may be used. Preferably, the shoulder 16 is non-consumable and is made of a refractory alloy (such as a molybdenum-based alloy, a tungsten-based alloy, or the like). Alternatively, the shoulder 16 is consumable and is made of a material that is the same as, similar to, or dissimilar from the workpiece to be friction stir welded. As described above, the shoulder 16 may be rotated about the axis 22 of the pin tool 12, the shoulder 16, and the pin tool holder 14. Optionally, the rotation of the shoulder 16 is independent of the rotation of the pin tool 12. Typically, the shoulder 16 is rotated at a speed of between 150 rpm and about 1000 rpm during friction stir welding. The shoulder 16 may also be selectively and continuously retracted into/extended from the pin tool holder 14, in conjunction with or independent of the retraction/extension of the pin tool 12.

The pin tool holder 14 also comprises an annular structure through which the pin tool 12 is fed. The pin tool holder 14 includes a spindle 24 and a plurality of end sections 26,28 configured to retain and guide the pin tool 12, the drive mechanism 18, the stem piece 20, and the shoulder 16. Preferably, the spindle 24 has a substantially cylindrical shape, although other suitable shapes may be used. The spindle 24 has an inside diameter that is slightly larger than the diameter of the pin tool 12 and the drive mechanism 18 in order to prevent interference. The length of the spindle 24 is as short as possible in order to prevent spindle run-out, which may affect positional accuracy, as well as weld quality/soundness. However, the length of the spindle 24 is long enough to allow a sufficient length of feedstock (i.e., the pin tool 12) to be provided in order to produce a weld of useful continuous length. Preferably, the spindle 24 is made of tool steel or the like. The inside surface 30 of the spindle and the drive mechanism 18 and stem piece 20 define one or more channels through which a cooling fluid flows. The cooling fluid is operable for cooling the pin tool 12 and/or the shoulder 16 and includes air, water, cooling oil, or any other suitable cooling fluid. Preferably, in the case of a consumable pin tool 12, the temperature of the tip of the pin tool 12 is maintained in a range in which the pin tool material is substantially plastic. For example, the temperature of the tip of the pin tool 12 is maintained in a range of between about 1,650 degrees F. and about 1,990 degrees F. for titanium alloys and about 1,800 degrees F. and about 2,200 degrees F. for steel and nickel alloys. Likewise, if a consumable shoulder 16 is used, the temperature of the shoulder 16 is maintained in a range in which the shoulder material is substantially plastic. For example, the temperature of the shoulder 16 is maintained in a range of between about 1,650 degrees F. and about 1,990 degrees F. for titanium alloys and about 1,800 degrees F. and about 2,200 degrees F. for steel and nickel alloys. The cooling fluid is introduced into the one or more channels via an exterior-mounted shoulder holder cooling device inlet and outlet (not shown) and a co-axial pin tool inlet 32 disposed in the spindle 24. In order to contain the cooling fluid within the one or more channels in the presence of rotating components, one or more seals 34, such as o-ring seals or the like, are used. Other suitable cooling mechanisms well known to those of ordinary skill in the art may also be used.

Although one preferred embodiment of the friction stir welding apparatus 10 of the present invention has been illustrated and described above, it should be noted that any suitable components or apparatuses that provide a rotating, movable, consumable pin tool 12 and a rotating or non-rotating, moveable or non-moveable, consumable or non-consumable shoulder 16 may be used.

As described above, the pin tool 12 is plunged into a rigidly clamped workpiece and traversed along a joint to be welded. The pin tool 12 provides a combination of frictional heat and thermo-mechanical working to accomplish the weld. As the pin tool 12 is traversed along the joint to be welded, the plasticized metal, metal alloy, or other material is transferred from the leading edge of the pin tool 12 to the trailing edge of the pin tool 12, forming a strong solid-state weld joint in the wake of the pin tool 12. The pin tool 12 is substantially continuously fed into the joint to be welded and is incorporated into the weld joint as filler material. Preferably, the pin tool 12 is fed into the joint to be welded at a rate that is sufficient to fill the joint preparation (e.g., square groove, V-groove, or J-groove) without underfill or substantial overfill. Advantageously, the friction stir welding techniques of the present invention may be used to apply surfacing welds with relatively little base metal penetration. It should be noted that the feed rate of the pin tool 12 varies based upon joint type and the material(s) being joined. Independent axial load feedback control is used for both the pin tool 12 and the shoulder 16. The pin tool load control is required to control the feed rate of the pin tool 12 and the shoulder load control is required to prevent the friction stir welding apparatus 10 from embedding in the workpiece. Typically, the shoulder 16 serves the same function as the shoulders of conventional friction stir welding apparatuses, namely, providing a continuous forging action and minimizing flash during friction stir welding. The shoulder 16 of the present invention also distributes the filler material evenly within the joint. If a consumable shoulder 16 is used, the shoulder material is incorporated into the weld joint as filler material or, alternatively, disposed on the surface of the weld in a layer.

Advantageously, the friction stir welding apparatus 10 of the present invention provides a defect-free weld joint, without entrapped pin tool debris. As a result, the weld joint demonstrates improved mechanical properties (e.g., mechanical strength). Because, in one embodiment of the present invention, the filler material is the same as or similar to the workpiece material, the weld joint demonstrates improved microstructure. The localized plastic deformation and filler material provided by the pin tool 12 lead to a microstructure characterized by relatively small grains and low porosity. The filler material may also be selected such that it has intermediate properties relative to two dissimilar materials to be joined, facilitating friction stir welding. Because, in another embodiment of the present invention, the filler material is dissimilar from the workpiece material, the material chemistry of the substrate may be locally altered and/or a clad layer or the like may be added using a consumable shoulder 16. In a further embodiment of the present invention, a filler material may be selected that has properties that are superior to either of two dissimilar materials to be joined, providing a joint with superior properties. The friction stir welding apparatus 10 of the present invention allows for the welding of complex joints, other than butt-joints, and the welding of workpieces with less-than-optimal fit-up (e.g., with large joint gaps or shape mismatches) due to the ability to add filler material. Finally, the friction stir welding apparatus 10 of the present invention provides the ability to locally increase the thickness of the weld joint, thus increasing joint efficiency.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A method for friction stir welding one or more metals, metal alloys, or other materials, the method comprising:
   providing a pin tool holder;
   providing a shoulder having a surface and an inside diameter;
   providing a pin tool coupled to the pin tool holder, the pin tool at least partially disposed within the inside diameter of the shoulder and at least partially protruding from the surface of the shoulder, wherein the pin tool consists of a consumable pin tool material;
   introducing the pin tool into a workpiece;
   traversing the pin tool along a joint to be welded on the workpiece; and
   forming a non-autogenous weld joint by substantially continuously feeding the pin tool as filler material into the weld joint as the pin tool is traversed along the joint, thereby incorporating at least a portion of the consumable pin tool material into the volume of the non-autogenous joint.

2. The method of claim 1, wherein providing the shoulder further comprises rotating the shoulder at a predetermined rotational speed.

3. The method of claim 1, wherein providing the shoulder further comprises retracting the shoulder into/extending the shoulder from the pin tool holder.

4. The method of claim 3, wherein providing the shoulder further comprises retracting the shoulder into/extending the shoulder from the pin tool holder at a substantially constant rate.

5. The method of claim 1, wherein the shoulder comprises a consumable shoulder material.

6. The method of claim 5, further comprising incorporating at least a portion of the consumable shoulder material into the volume of the joint to be welded.

7. The method of claim 5, wherein the consumable shoulder material comprises a material that is the same as one or more materials comprising the workpiece to be friction stir welded.

8. The method of claim 5, wherein the consumable shoulder material comprises a material that is similar to one or more materials comprising the workpiece to be friction stir welded.

9. The method of claim 5, wherein the consumable shoulder material comprises a material that is dissimilar from one or more materials comprising the workpiece to be friction stir welded.

10. The method of claim 1, wherein providing the pin tool further comprises rotating the pin tool at a predetermined rotational speed.

11. The method of claim 1, wherein providing the pin tool further comprises retracting the pin tool into/extending the pin tool from the surface of the shoulder.

12. The method of claim 11, wherein providing the pin tool further comprises retracting the pin tool into/extending the pin tool from the surface of the shoulder at a substantially constant rate.

13. The method of claim 1, wherein the consumable pin tool material comprises a material that is the same as one or more materials comprising the workpiece to be friction stir welded.

14. The method of claim 1, wherein the consumable pin tool material comprises a material that is similar to one or more materials comprising the workpiece to be friction stir welded.

15. The method of claim 1, wherein the consumable pin tool material comprises a material that is dissimilar from one or more materials comprising the workpiece to be friction stir welded.

16. The method of claim 1, wherein the shoulder has a substantially cylindrical shape.

17. The method of claim 1, wherein the pin tool has a shape selected from the group consisting of substantially cylindrical, substantially rod-like, and substantially conical.

18. The method of claim 1, wherein the pin tool has a substantially tapered shape comprising a tip radius.

19. The method of claim 1, further comprising receiving a first axial load feedback from the shoulder and controlling a feed rate of the shoulder based on the first axial load feedback.

20. The method of claim 19, further comprising receiving a second axial load feedback from the pin tool and controlling a feed rate of the pin tool based on the second axial load feedback.

21. The method of claim 20, wherein the feed rate of the shoulder is equal to the feed rate of the pin tool.

* * * * *